(12) United States Patent　(10) Patent No.: US 8,284,987 B2
Ulichney et al.　(45) Date of Patent: Oct. 9, 2012

(54) PAYLOAD RECOVERY SYSTEMS AND METHODS

(75) Inventors: Robert Alan Ulichney, Stow, MA (US); Matthew D. Gaubatz, Ithaca, NY (US); Steven J. Simske, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 258 days.

(21) Appl. No.: 12/885,096

(22) Filed: Sep. 17, 2010

(65) Prior Publication Data

US 2012/0070030 A1　Mar. 22, 2012

(51) Int. Cl.
*G06K 9/00*　(2006.01)
(52) U.S. Cl. ....................................................... 382/100
(58) Field of Classification Search ................... 382/100
See application file for complete search history.

(56) References Cited

U.S. PATENT DOCUMENTS

| | | | |
|---|---|---|---|
| 5,710,827 A | 1/1998 | Perumal, Jr. et al. | |
| 5,790,703 A * | 8/1998 | Wang | 358/3.28 |
| 5,946,414 A * | 8/1999 | Cass et al. | 382/183 |
| 6,141,441 A * | 10/2000 | Cass et al. | 382/166 |
| 6,690,389 B2 | 2/2004 | Ulichney | |
| 7,034,955 B2 | 4/2006 | Bearss et al. | |
| 7,057,770 B2 * | 6/2006 | Case | 358/1.9 |
| 7,528,993 B2 * | 5/2009 | Rosen | 358/3.28 |
| 7,952,767 B2 * | 5/2011 | Sharma et al. | 358/3.28 |
| 8,009,329 B2 * | 8/2011 | Bala et al. | 358/3.28 |

OTHER PUBLICATIONS

Pei, et al., "Novel Robust Watermarking Technique in Dithering Halftone Images", IEEE Signal Processing Letters, vol. 12, No. 4, Apr. 2005, pp. 333-336.
Chiang et al. Printer and Scanner Forensics, IEEE Signal Processing Magazine, Mar. 2009, pp. 72-83.

* cited by examiner

*Primary Examiner* — Tom Y Lu (57) ABSTRACT

A payload recovery system includes a reference halftone image of a data-bearing halftone image and a reference map of the data-bearing halftone image. The system further includes a cell alignment system for receiving a scanned image of a hard copy of the data-bearing halftone image and for generating an aligned scan of the scanned image using the reference halftone image and the reference map. A raw payload recovery system determines possible shift positions of each carrier cell of the aligned scan using a shift rule and the reference map; and a reconstructed data-bearing halftone image is generated by the raw payload recovery system using the possible shift positions and the reference halftone. The system also includes a recovered raw payload generated by the raw payload recovery system using the shift rule and the reference map.

20 Claims, 7 Drawing Sheets

PAYLOAD RECOVERY SYSTEMS AND METHODS

BACKGROUND

The present disclosure relates generally to payload recovery systems and methods.

Barcodes are a popular means for encoding information in printed matter; however, they are overt and often unsightly. If an image is to be a part of the composition of the printed label or page, a viable alternate to using a barcode is to hide information in the image. It has been found that information may be encoded in the halftone of an image, using techniques such as cluster-dot halftoning. The process takes any grayscale image and a payload of data to be encoded therein as input, and produces a bitonal clustered-dot halftone of that image with selected halftone clusters shifted to carry varying number of bits from the payload. The result is a data-bearing steganographic halftone (i.e., stegatone). The small size and large number of clustered-dot cells in printed halftones allow the printer/encoded bit density to be quite high, typically over 2000 bytes/square-inch. While this encoding process has been successful, suitable systems and methods for properly decoding data-bearing steganographic halftones at high payload densities are not readily available, due in part to alignment issues.

BRIEF DESCRIPTION OF THE DRAWINGS

Features and advantages of examples of embodiments of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Embodiments of the payload recovery system disclosed herein are capable of retrieving the embedded payload of data from a hard copy of the data-bearing halftone image. To decode the data-bearing halftone image, the system(s) use at least a reference halftone image for the data-bearing halftone image, a reference map for the data-bearing halftone image, and any shift rules used to create the data-bearing halftone image. The system(s) align the scanned data-bearing halftone image and compare the aligned scan with reference values to determine cell shift positions from which the embedded payload bits are derived.

Figure 1:
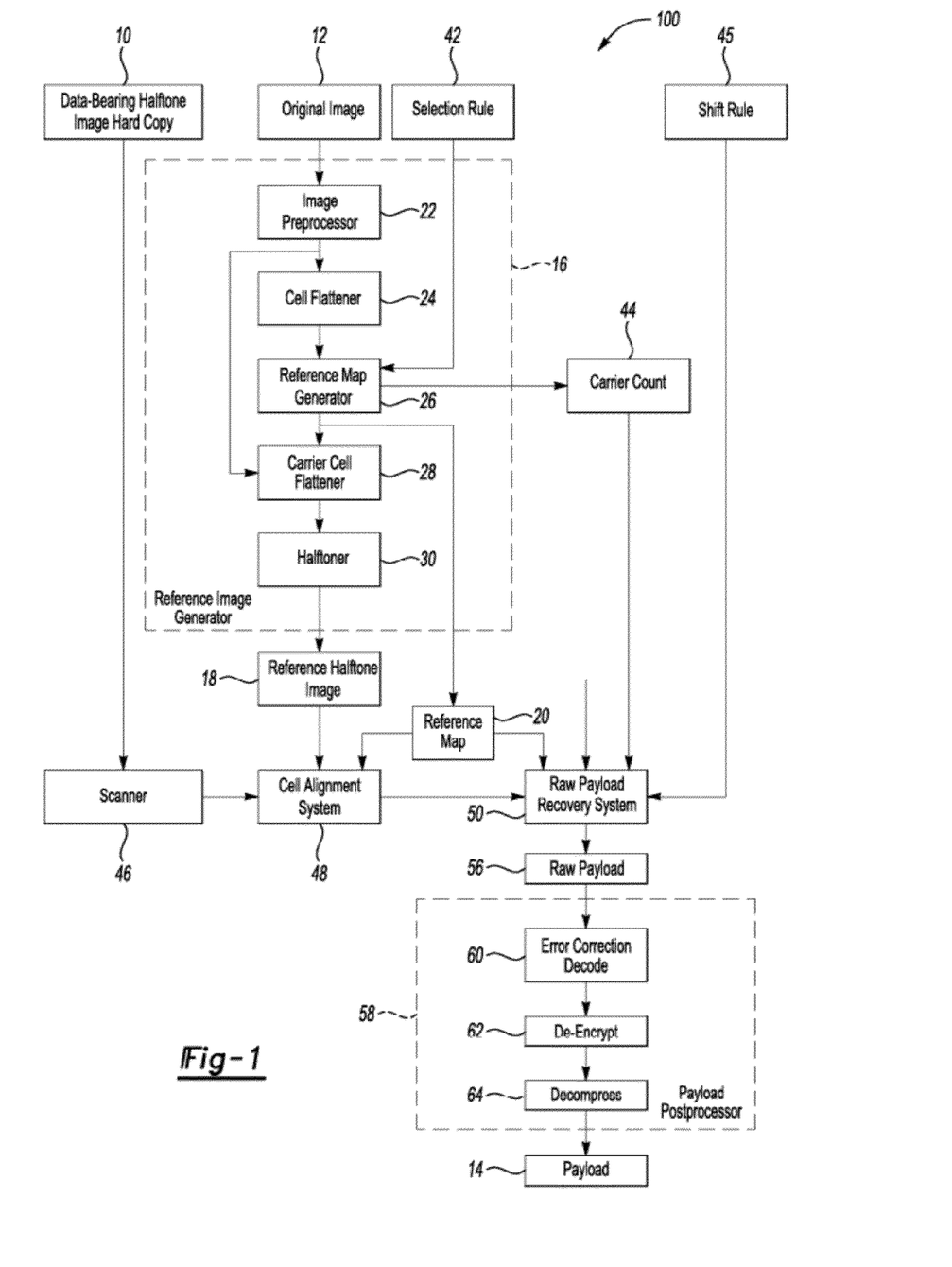
FIG. 1 is a schematic diagram of an embodiment of a payload recovery system.

An embodiment of a system 100 for recovering a payload from a data-bearing halftone image is illustrated in FIG. 1. Very generally, the system 100 includes various sub-systems and/or components (each of which will be described further herein) for performing one or more of the method steps. The overall system 100 may include a network of interconnected computers and/or other electronic devices (e.g., scanners, printers, etc.), including virtualized and/or redundant processors, banks of processors and/or servers, etc. It is to be understood that the components of the system 100 may be implemented in a consolidated location, or portion(s) of the system 100 may be implemented at different locations.

The hardware of at least some of the sub-systems includes an electronic processing device, such as, for example, a controller, a micro controller, a microprocessor, a host processor, an application specific integrated circuit (ASIC), and/or a reprogrammable hardware logic device (such as a field programmable gate array (FPGA)). It is to be understood that the electronic processing device may be a processor working in conjunction with a central processing unit (CPU) performing the function of a general-purpose processor. Computer program(s) and/or software (e.g., computer readable code) may be loaded onto one or more of the sub-systems, and stored in a memory thereof. Such programs and/or software are executable via a processing device.

In the embodiment of the system shown in FIG. 1, the data-bearing halftone image 10 and the original (or input) image 12 (from which the data-bearing halftone image is created) are used to recovery the payload 14. It is to be understood that the original image 12 may be any grayscale image including photographs, graphics, text, or a constant area, such as the background of a page. One non-limiting example of an original image 12 is a company logo.

In this embodiment, the original image 12 is processed using a reference image generator 16 to create a reference halftone image 18 and a corresponding reference map 20 that are used for the accurate recovery of the payload 14. In one embodiment, the reference image generator 16 is a printer controller or a component thereof. The reference image generator 16 is a sub-system of the system 100, which includes an image preprocessor 22, a cell flattener 24, a reference map generator 26, a carrier cell flattener 28, and a halftoner 30.

Prior to describing the reference image generator 16, a discussion of halftoning is deemed useful. Halftoning refers to any process that creates the illusion of continuous-tone images by the arrangement of binary picture elements, such as ink drops. In one embodiment, halftoning is printing the simulation of a continuous-tone image, such as the original images described above, with groups or cells of color or black dots. The placement of the dots appears to the human eye to be a single color. In one embodiment, digital halftoning is called spatial dithering. In another embodiment, spatial dithering is a subset of digital halftoning.

An ordered dither consists of turning on the output bit for a pixel if the intensity level is greater than the threshold of a particular matrix element at that pixel position. Ordered dithering of images can employ clustered-dot and dispersed-dot methods. Clustered-dot halftoning generates dots in "clustered" patterns. In other words, as input intensity increases, new pixels intensified in each pattern are placed adjacent to already-intensified pixels. Clustered-dot halftoning is often used in both dry toner and liquid toner electrophotographic processes, at least in part because they produce dots that are quite stable (i.e., less susceptible to errors and data loss than dispersed-dot techniques). The use of any of the clustered-dot algorithms known in the art are contemplated for use with the present embodiments.

The nature of any ordered dither is dictated by a deterministic, periodic array of threshold values. Ordered dithering employs a dither matrix, which is an array of integer threshold values, to produce the shaded output image. The dither matrix is commonly smaller than the input image, and therefore is repeatedly tiled over the input image. Each color value of the input image is compared against a dither matrix threshold value. When the input value is greater than the threshold value, the output pixel is turned "on". Conversely, if the input value of the pixel is less than or equal to the threshold value, the output pixel is turned "off". It is to be understood that the output described by the relative terms "on" and "off" will depend on the output device. For example, turning "on" a pixel of a halftone display can refer to the pixel going from black to white. However, printing the image with a printer could involve a reversal, in which black pixels represent actual output (i.e. the printing of a dot of black ink). The dither matrix thresholds essentially determine which pixels of the original image are displayed on the output device, and thus the ordering of the threshold values in the dither matrix affects the quality of the output image.

Figure 2:
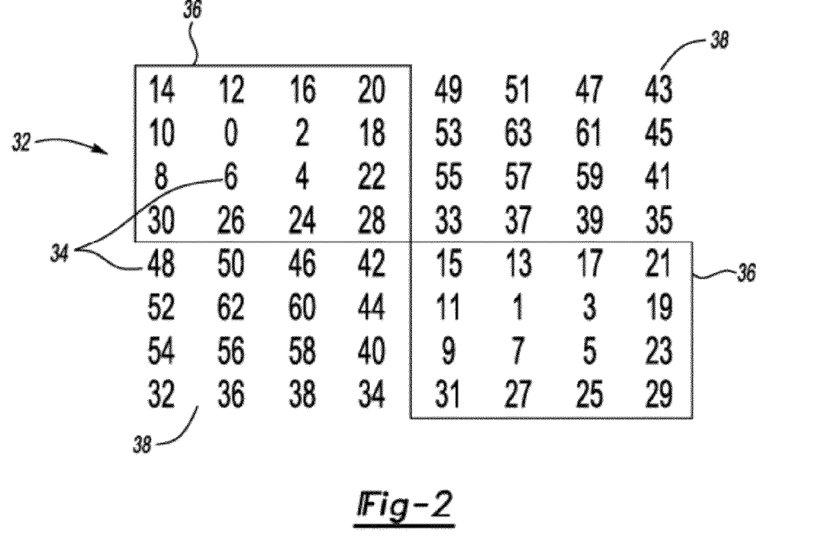
FIG. 2 is an embodiment of a dither template for use in clustered-dot halftoning.

For clustered-dot halftoning, the thresholds are arranged so that output pixels will form ever-increasing white cluster sizes as input values increase from full black, and then ever-decreasing black cluster sizes as input values further increase to full white. The rule or order of thresholds is specified by a dither matrix or dither template. An example of a dither template 32 is shown in FIG. 2. This template 32 comprises an 8×8 matrix of pixel positions 34 with values from 0 to 63 that define the order that pixels will be turned "on" or "white". This arrangement forms a 45-degree screen. The 4×4 submatrices defined by the outlined boxes represent shadow cells 36, and the unboxed 4×4 submatrices represent highlight cells 38. The two cell types are also distinguishable by the spatial arrangement of pixel activation order. Shadow cells 36 produce patterns that manifest as white clusters surrounded by black (i.e., pixels are activated centrally first then progressively to the edges). Highlight cells 38 produce patterns that manifest as black clusters surrounded by white (i.e., pixels are activated first on the edge and then progressively centerward).

The actual threshold values that are to be used to compare against 8-bit input pixel values can be normalized. This may be accomplished to align the mean input intensity with the range of thresholds, or to scale the input range to the threshold range. As such, the most possible threshold values can be utilized in the dither template 32. Known approaches to normalization may be used. One mean-preserving relationship that can be used to scale the template values $T[x,y]$ to threshold array values $A[x,y]$ is:

$$A[x,y]=255-\text{int}\{(255/64)(T[x,y]+\tfrac{1}{2})\}$$ [Equation 1]

Figure 3:
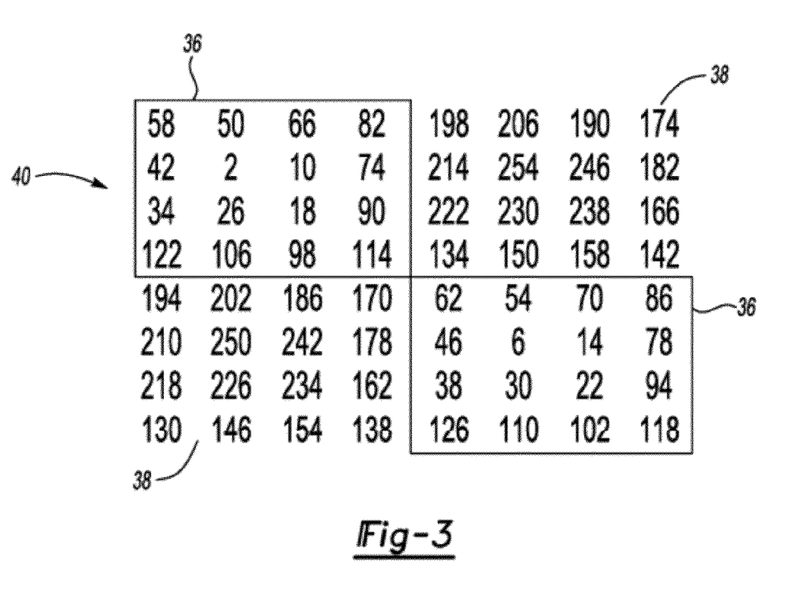
FIG. 3 is an embodiment of a threshold array based on the dither template of FIG. 2.

The resulting normalized threshold array 40 is shown in FIG. 3. A halftoning algorithm uses this array to compare with an input pixel $I_i$, to binarize the output pixel $I_o$ as follows:

$$\text{if } I_i \geq A[x,y] I_o=1; \text{ else } I_o=0$$ [Equation 2]

Figure 4A:
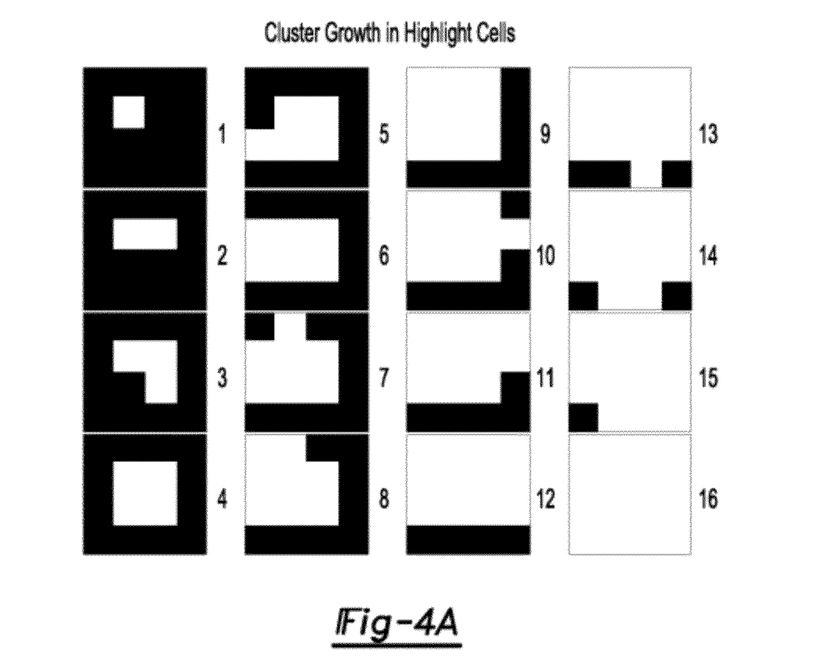
FIGS. 4A and 4B are schematic diagrams illustrating a change in cluster shape with increasing cluster size in highlight cells (FIG. 4A) and shadow cells (FIG. 4B) rendered using the dither template of FIG. 2.
Figure 4B:
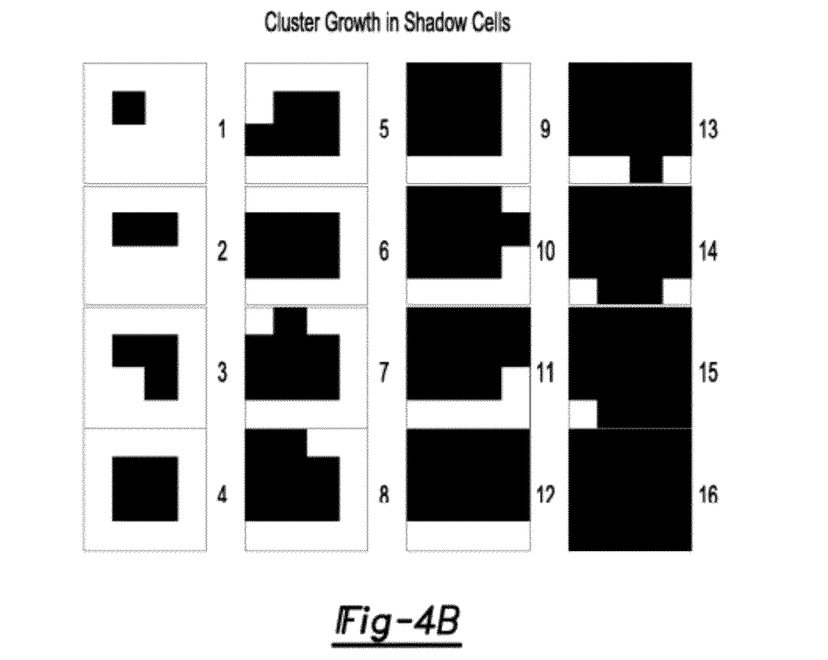

Using this array to halftone an input original image 12 that includes a folded grayscale ramp produces an image where the shadow cells 36 are illustrated with white "holes" and highlight cells 38 are illustrated with black clusters. The 4×4 highlight cells 38 take on the shapes shown in FIG. 4A. With increasing input intensity, additional pixels are printed (or omitted), causing the cluster to grow. In FIG. 4A, the number of white pixels that make up the center cluster is indicated next to the cell. Likewise, FIG. 4B illustrates cluster growth in the sixteen possible shadow cells 36. Like FIG. 4A, the number of black pixels making up the respective clusters is identified next to the cell. The cell shapes shown are dictated by the specification of the dither template 32 in FIG. 2. It is to be understood that a differently patterned template would result in a different pattern of cluster growth. It is to be further understood that any dither template arrangement suited for producing clustered-dot patterns may be used in the embodiments disclosed herein.

The progression of cluster shapes arising from a dither template 32 is used to render constant areas of the input original image. High-frequency detail (e.g., edges) can pass through a dither cell intact, i.e., the shape of the cell will reflect the detail shape, rather than an intensity-dependent cluster. Deviations of these cell shapes in response to such detail is referred to as "partial dots". As a result, the halftoned image more accurately preserves edges and details so as to provide a more accurate rendition of the continuous-tone, original image.

Information can be embedded into a subset of the rendered cells by encoding the information as single pixel shifts of the clusters within each cell. Not all cell shapes will afford their clusters the same degree of freedom to move. Cells that have room for a cluster to move to at least 2 single pixel shift positions can encode at least one bit of data, and therefore can be defined as "carrier cells". For example, cells 1 through 9 in both FIGS. 4A and 4B are potential carrier cells.

Figure 5:
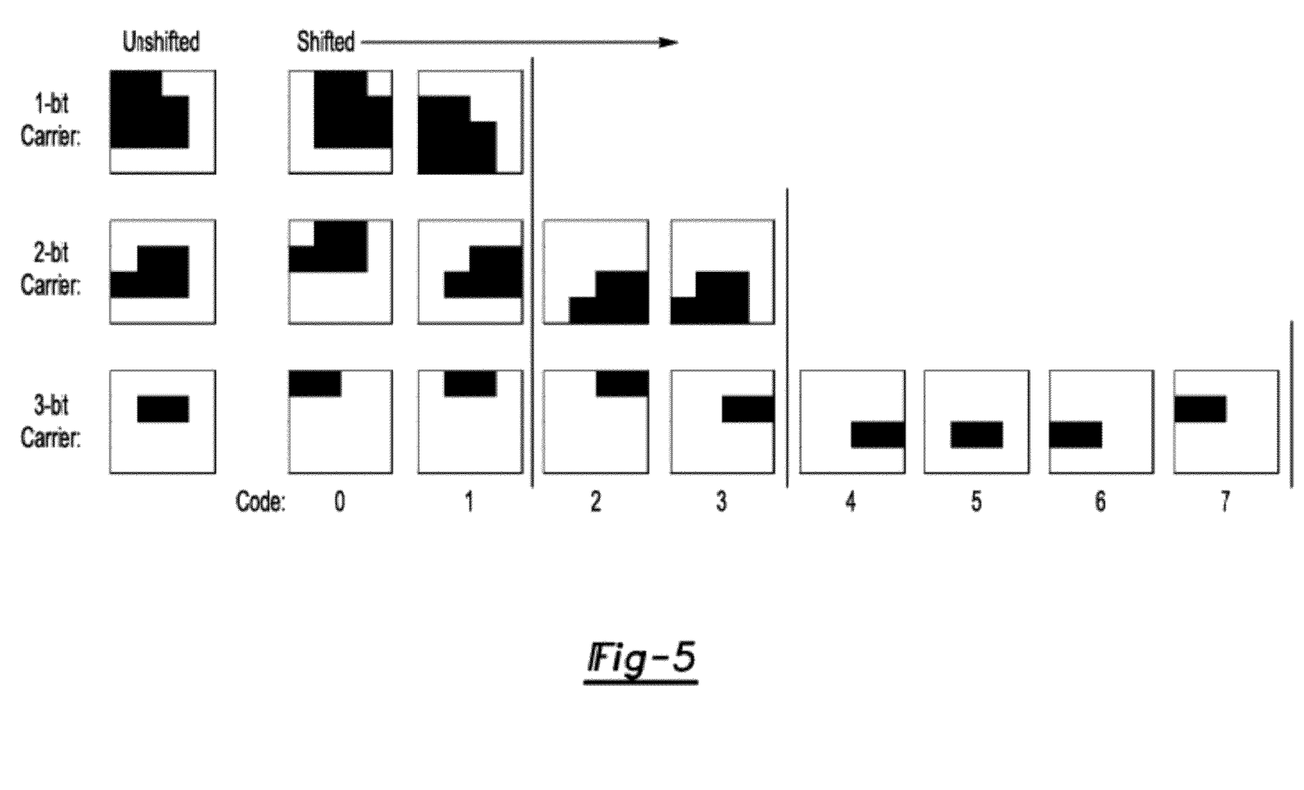
FIG. 5 is a diagram illustrating available shift positions and corresponding codes for three different examples of shadow cells.

More available shift positions in a shape means that more bits can be encoded in the cell. Cells 1 through 4 in FIGS. 4A through 4B can move to all eight surrounding positions, and can thus carry three bits. Cells 5 and 6 in FIGS. 4A and 4B can move to five positions, four of which can be used to encode 2 bits. Cells 7, 8 and 9 can move to three positions, and thus can carry 1 bit. FIG. 5 illustrates this principle for example 1-bit, 2-bit and 3-bit shadow cells.

The mapping of 1-bit, 2-bit, and 3-bit codes to shift positions can be defined by a shift rule 45. A non-limiting example of a shift rule 45 is illustrated below.

| 1-bit carrier | | |
|---|---|---|
| x | x | x |
| x | C | 0 |
| x | 1 | x |

| 2-bit carrier | | |
|---|---|---|
| X | 0 | x |
| X | C | 1 |
| X | 3 | 2 |

| 3-bit carrier | | |
|---|---|---|
| 0 | 1 | 2 |
| 7 | C | 3 |
| 6 | 5 | 4 |

Example Shift Rule

In this example shift rule 45, the unshifted position is shown in the center C of each 3×3 array, with the remainder of the array including putative shift positions. An entry of "x" is used to indicate shift positions that are not used, and entries of 0, 1, 2, etc. indicate the shift position of a code of that particular value. For example, for the 1-bit carrier shift rule, embedding a code of "0" will cause a shift right by 1 pixel; while embedding a code of "1" will cause a shift down by 1 pixel. It is to be understood that other shift rules 45 may be used in accordance with the embodiments disclosed herein.

Unshifted carrier cells may be used as marker cells (see cells labeled "M" in FIG. 10) to communicate special signals to the payload recovery system 100, as will be discussed further hereinbelow. For example, a particular number of consecutive marker cells may be used to indicate the separation between repeating streams of payload bits.

A carrier selection rule can be employed to specify which carrier cells and shift positions will be used for data encoding. The carrier selection rule can be specific to a particular type of target device, to a particular category within that type, or even to a specific device. Table 1 below illustrates an example of a selection rule specification, in which each cluster size is either accorded a bit value (1, 2, or 3) or designated as a non-carrier (0).

TABLE 1

| Highlight Cells | | Shadow Cells | |
| --- | --- | --- | --- |
| Size | Bits | Size | Bits |
| 1 | 3 | 1 | 0 |
| 2 | 3 | 2 | 0 |
| 3 | 3 | 3 | 0 |
| 4 | 3 | 4 | 3 |
| 5 | 2 | 5 | 2 |
| 6 | 2 | 6 | 2 |
| 7 | 1 | 7 | 1 |
| 8 | 1 | 8 | 1 |
| 9 | 1 | 9 | 1 |
| 10 | 0 | 10 | 0 |
| 11 | 0 | 11 | 0 |
| 12 | 0 | 12 | 0 |
| 13 | 0 | 13 | 0 |
| 14 | 0 | 14 | 0 |
| 15 | 0 | 15 | 0 |
| 16 | 0 | 16 | 0 |

In this table, a value of zero bits indicates that that cell type is a non-carrier. In the example shown, the selection rule specifies that all potential highlight cells are useable with their maximum bit capacity, while the smallest shadow cells (e.g., 1, 2, and 3) are deemed non-carriers. This determination may be made based on the limitations of a target device. For example, the small white dots associated with shadow cells 1, 2 and 3 may not be produced reliably enough by certain printers due to dot gain in surrounding pixels. Accordingly, in one aspect of the embodiment, an encoding system is designed with particular known output and the recovery device in mind. A selection rule is used that provides for carrier cells that are rendered robustly in the data-bearing output and/or are reliably detected by the recovery system 100.

After carrier selection, a number of non-carrier cells may remain. As discussed above, these can include cells having partial dots due to edges or other details in the image, as well as potential carrier cells that are excluded by the selection rule. As will be discussed further below, these non-carrier cells can serve useful purposes in the recovery process, such as to delineate data areas or provide points of reference for properly aligning images.

The reference image generator 16 of FIG. 1 utilizes the original input image 12 to generate the reference halftone image 18 and the reference map 20. This output is the same reference halftone image 18 (i.e., halftone rendering of the original image 12) and reference map 20 (i.e., a specification of the image's data carrying characteristics) that was used to encode the data-bearing halftone image 10.

Processes typically associated with preparing an image for printing can be performed by the image preprocessor 22. In one embodiment, these processes include decompression of the original image 12, adjusting the image histogram to accommodate non-linearity in the input-to-hardcopy print process, and scaling the image 12 to the device resolution of the printer. These processes are examples of preprocessing for rendering, and are not intended to be limiting. It is to be understood that other processes that are associated with rendering images in a given target device may also be included in the image preprocessor 22.

The reference image generator 16 also includes a cell flattener 24. Flattening of the cells in the image facilitates the detection and selection of potential carrier cells. The original image 12 is segmented into blocks that correspond to halftone cluster locations. The cell flattener 24 sets all of the pixels in each block to a single representative value (e.g., the average of the input therein). In the examples illustrated herein, in which halftone cells include 4×4 pixels, the cells have all 16 pixels temporarily set to a value equal to their average by the cell flattener 24. As a result, this flattened image is one-fourth the size of the original image 12 in each dimension.

In order to properly assess the data capacity of the hardcopy of the data-bearing halftone image 10, a reference map 20 of the original image 10 is generated. This map 20 is the product of an analysis of the image 10, where the analysis involves an inventory of available carrier cells. In this process, the flattened image (now segmented into cells and flattened so that each cell holds a single average value) is assessed using the carrier selection rule. More particularly, each cell is assessed based on its value to determine whether the resulting halftone cluster will exhibit a shape that is useful for encoding data. Accordingly, the reference image generator 16 includes the reference map generator 26, the flattened carrier image, and the carrier selection rule (see reference numeral 42). By referring to the dither threshold array 40 (see FIG. 3) the reference map generator 26 first applies a halftone screen to the flattened image, segmenting the image into highlight cell and shadow cell regions.

Figure 6:
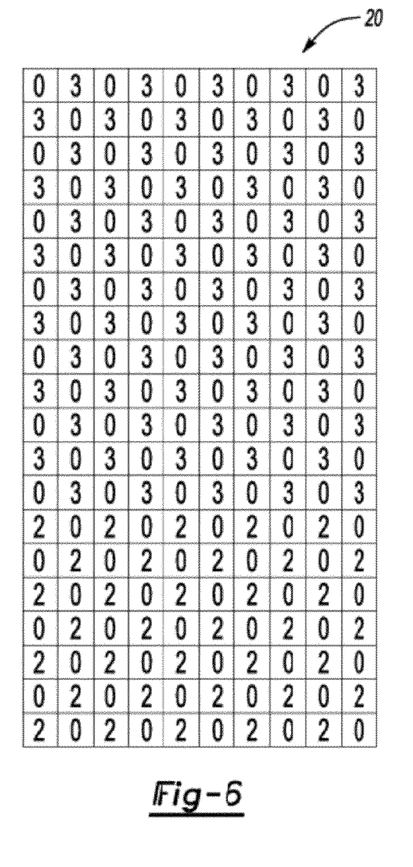
FIG. 6 is a diagram of an embodiment of a reference map.

The reference map 20 can then be populated according to carrier selection rule(s). Each highlight cell and shadow cell can be halftoned according to the applicable equation (e.g., Equation 2), and the cluster size can be determined by counting the number of pixels having a value of 1. A table can be generated in which each possible input value (e.g., 0 to 255 for the 8-bit example) is mapped to a cell size. The number of bits corresponding to each cell size is provided by the corresponding carrier selection rule 42 (i.e., for highlight cells or for shadow cells). The resulting reference map 20 specifies all of the locations in which payload data can be encoded and the amount of data each location can hold. The reference map 20 can present this information alphanumerically, e.g., in the form of a table, or graphically. One example of a reference map 20 generated by the reference image generator 16 and presented alphanumerically is shown in FIG. 6. The reference map 20 in FIG. 6 indicates the number of carrier bits assigned to each cell, where 0 represents a non-carrier. This array of numbers can be generated by an encoding system and transferred to the decoding system, or can be generated at the decoding system (as described herein). In another embodiment, the reference map 20 can be a depiction of the segmented image in which all of the cells are shown with a code signifying their status (carrier or non-carrier) and data capacity.

The reference map generator 26 can also output a carrier count 44 using the information that was used to generate the reference map 20. The carrier count 44 is the total bit capacity of all carrier cells in the image 12. As will be discussed below, this information may be used by a raw payload recover system 50 to identify the payload in the data-bearing halftone image 10.

The reference map 20 may be used by the carrier cell flattener 28 to further process the image 12. In particular, the carrier cell flattener 28 can use the reference map 20 and the original image 12 to identify the cells tagged as carriers. The carrier cell flattener 28 then flattens only those cells identified as carriers, leaving the non-carrier cells intact. The non-carrier cells will retain the untouched high-frequency detail that will be manifested as partial dots in the output reference halftone image 18.

Figure 7:
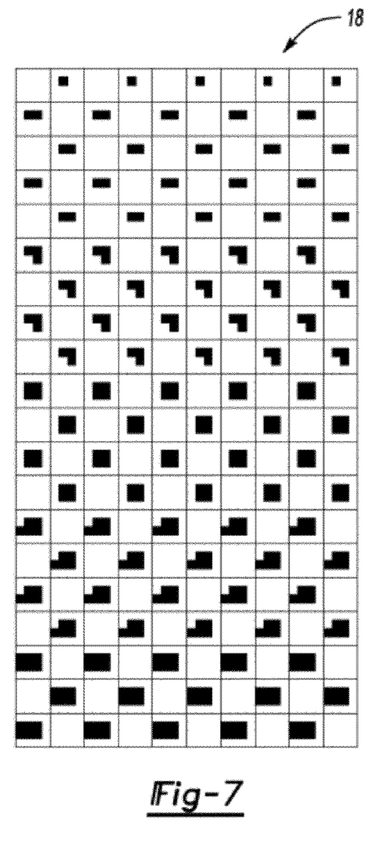
FIG. 7 is a semi-schematic diagram of an embodiment of a reference halftone image.

The reference image generator 16 also includes a halftoner 30. The halftoner 30 halftones the image (with the selective carrier cell regions flattened) using the threshold array 40 to produce the reference halftone 18. An example of a cluster-dot reference halftone 18 (that corresponds with the reference map 20 in FIG. 6) is shown in FIG. 7. It is to be understood that the reference halftone illustrates unshifted positions of the clusters.

Referring back to FIG. 1, the generated reference halftone image 18 and the reference map 20 are supplied as electronic input to a cell alignment system 48. Also supplied to the cell alignment system 48 as electronic input is a scanned image of the hard copy of the data-bearing halftone image 10. Any suitable scanner 46 may be used to generate the scanned image of the data-bearing halftone image 10 as long as the resolution of the scanner 46 is as high as the resolution of the source printer. This resolution enables the individual pixels to be resolved.

The cell alignment system 48 includes algorithms for locating the position of the data-bearing halftone image 10 in the scanned image, for de-skewing the scanned image, for fine tuning the horizontal and vertical scale factors, and for determining the boundaries of the 4×4 halftone cells. The approximate location of the data-bearing halftone image 10 can be determined, in one embodiment, by a pixel-based correlation operation or a multi-scale correlation operation, using either binary or grayscale image data. Scaling can be readily determined by comparing 2D fast Fourier transforms, and skew information can be assessed via blind or comparative Hough transform analysis. In another embodiment, the locating, de-skewing and fine-tuning operations involve iterating over several possible sets of transformation parameters, performing spatial transforms defined by those parameters on the scanned image, and choosing the set of parameters that results in the transformed image that most closely resembles the reference halftone, or a proxy for the reference halftone, such as a predefined grid or other pattern. A measurement of closeness may be determined by mean-squared-error, correlation, Hough transform-based comparisons, or other functions capable of quantifying differences in images. In addition, fiducial markings and/or other image content printed on the same page could be used to assist in the alignment process.

The reference halftone 18 and reference map 20 may be referenced to complete these tasks. As one example, some of the cells identified as non-carriers (i.e., 0 bits) in the reference map 20 can be used as reference/alignment cells in the scanned image of the data-bearing halftone image 10, as they will appear the same as the unshifted cells in the reference halftone 18. As another example, transformations may be applied to the scanned image that attempt to align it with the reference halftone 18, and then the transformed image may be compared with the reference halftone 18 to evaluate the attempted alignment. Either the reference map 20 or the reference halftone 18 may be used to efficiently process and align different regions in a larger data-bearing halftone image 10. Based on the local (i.e., to the cell) image properties, information may not be imbedded in certain areas of the data-bearing halftone image 10. This may occur, for example, when the data-bearing halftone image 10 has some variable and/or customized portions (e.g., corresponding to a mass serialized number overwriting part of it, variable text such as customer contact information, variable logo information (e.g., for localization), etc.). Some embodiments of the cell alignment system 48 may involve searches for non-carrier cells that match reference halftone 18 cells exactly, or carrier cells with pre-specified relationships between the chosen shifts and the halftone cells 18. Cluster mapping approaches and/or methods capable of determining correspondences between groups of cells, may be useful in this regard.

Alignment can be global (i.e., across the entire scanned image), affine and non-affine (i.e., correct for skew, shift, orientation, warp, and other distortion(s)), or selective/graded. When selective or graded alignment is used, the user of the cell alignment system 48 can assess which portion(s) of the scanned image are of sufficient quality in order to obtain reliable payload information, and align that/those portion(s) of the scanned image. Larger images may also have sub-regions that are independently (or neighbor-dependently) registered.

Figure 8:
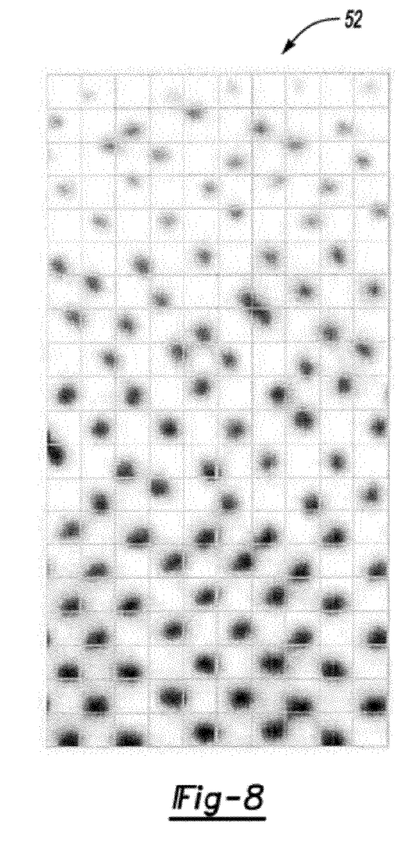
FIG. 8 is a grayscale representation of an embodiment of an aligned scan of a data-bearing halftone image.

The result of the cell alignment system 48 is an aligned scan. A grayscale illustration of an example of the aligned scan 52 is shown in FIG. 8. The result of the alignment process is depicted by the overlaid grid of cell boundary lines.

The aligned scan 52 is then input into a raw payload recovery system 50. In addition to receiving the aligned scan 52, the raw payload recovery system 50 also receives the reference halftone 18, the reference map 20, the carrier count 44, and the shift rule 45 (i.e., the same shift rule as used by an encoder of the data-bearing halftone image 10). The goal of the raw payload recovery system 50 is to determine the individual shift positions of each carrier cell of the aligned scan 52. "Shift positions" indicate configurations of pixels that differ from the reference halftone 18. One position, marked with a "C" in the Shift Rule Example provided herein is the unshifted position, that is, the position as rendered in the reference halftone 18. The raw payload recovery system 50 may use the shift rule 45 in combination with the reference map 20 to identify which shift positions are possible for each carrier cell of the aligned scan 52. For example, if the reference map 20 indicates that the cell is a 2-bit carrier, the shift rule 45 may be used to determine that the cluster could have been shifted to four possible positions, each of which can be used to encode 2 bits. In this example, it is to be understood that in some embodiments, the configuration of pixels in the reference halftone cell may represent one of the possible shift positions. To facilitate understanding, the unshifted position may be equated to, for example, (0,0) in (x,y) coordinates, so that the shifted bits can be determined from some logical combination of $\{(0,-1), (1,-1), (1,0), (1,1), \text{ and } (0,1)\}$ (e.g., 00 can be (0,−1), 01 can be (1,0), 10 can be (1,1) and 11 can be (0,1)). It is to be understood that this example is non-limiting, and that many other examples are possible. The raw payload recovery system 50 can generate multiple candidate shifted cell images (based upon the information from the shift rule 45 and the reference map 20) using the unshifted version of the reference halftone 18.

In order to estimate which of the candidate shifted cell images corresponds with the data-bearing halftone image 10, a number of processes can be performed by the raw payload recovery system 50. Two non-limiting examples of suitable methods include minimizing mean-square-error and centroid matching. Other suitable methods include argmax (overlapped binarized black pixels) which chooses the shifted cell with the most black pixels in the same location as a binarized version of the scanned cell; correlation maximization; or mutual information maximization. It is to be understood that these methods could involve serial, iterative, and/or global processing to determine the shifts associated with all cells.

Figure 9:
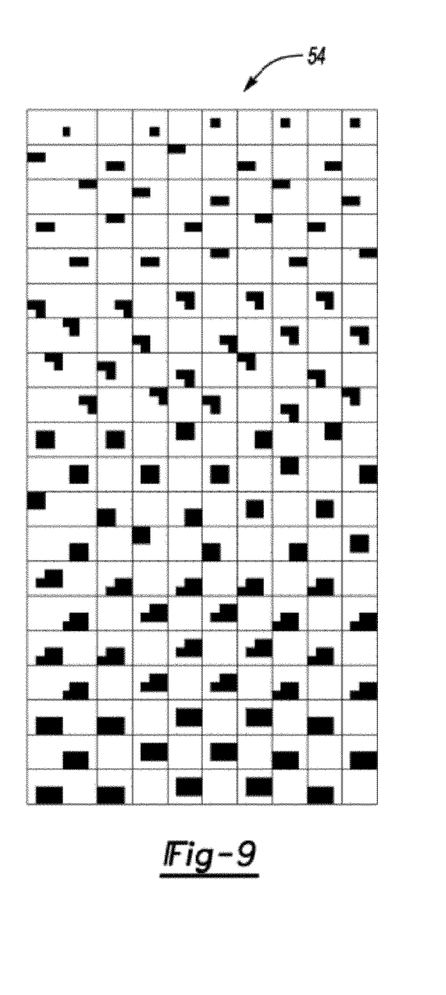
FIG. 9 is a reconstructed data-bearing halftone image corresponding with the aligned scan of FIG. 8.

Minimizing mean-square-error finds the minimum difference in terms of the mean-square-error between the scanned cells and the valid candidate shifted cell images. The process results in the recovered shift positions, which are represented using a reconstructed data-bearing halftone image 54, as shown in FIG. 9. In one embodiment, the reconstructed data-bearing halftone image 54 is bitonal. Minimizing mean-square-error may be advantageous because it yields strong performance, even when the data is very noisy and an appropriate cell binarization strategy may not be apparent. Centroid matching involves binarizing each scanned cell, and comparing the location of the centroid of each cell with the location of the centroids of the corresponding valid candidate shifted cell images. Centroid matching may be advantageous because it can be applied on any size aligned scan and because of its speed, which is a result of the process accessing the pixels in the scanned cell one single time.

Figure 10:
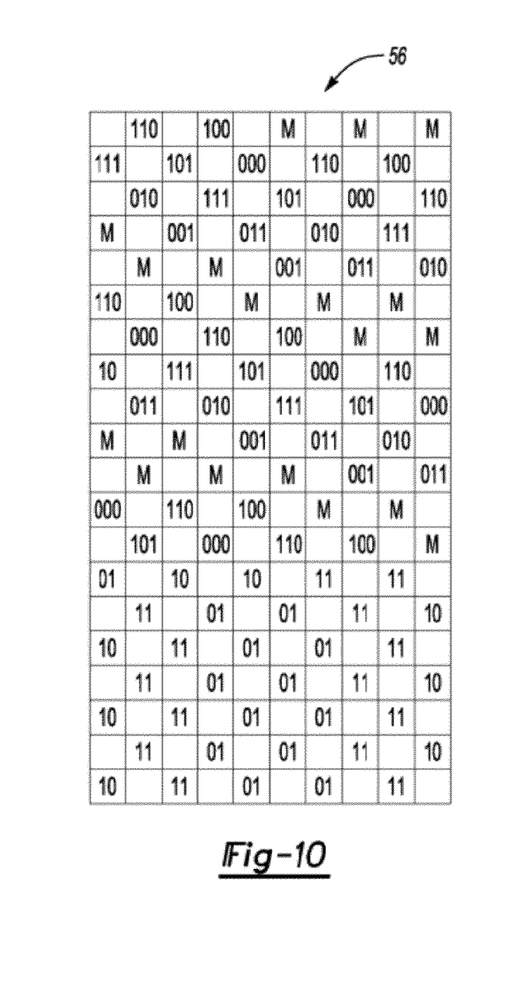
FIG. 10 is a raw payload of the reconstructed data-bearing halftone image of FIG. 9.

The identified shift positions are then used with the appropriate 1-, 2-, or 3-bit shift rule 45, as dictated by the reference map 20, to arrive at the code for each carrier cell. An example of the retrieved binary codes (or raw payload 56) is shown in FIG. 10. An entry of "M" is used to denote the previously mentioned marker cells, or cells that represent an unshifted carrier cell that may be used to indicate a separation between the end and beginning of repeated sequences of the raw payload.

As shown in FIG. 1, the raw payload 56 is then passed to a payload postprocessor 58, which includes sub-systems that are programmed to perform one or more processes to undo or reverse any processes performed on the payload during encoding. As such, the goal of this module is to invert any transformations to the data applied by a payload prepocessor in the encoding system. The payload postprocessor sub-systems may include an error correction decoding system 60, a de-encryption system 62, and a decompression system 64. The error correction decoding system 60 uses parity or other redundant forms of coding to compensate for incorrectly recovered bits. The de-encryption system 62 de-encrypts the data, which in some instances is error-corrected data. The decompression system 64 decompresses the data to produce the payload 14.

Figure 11:
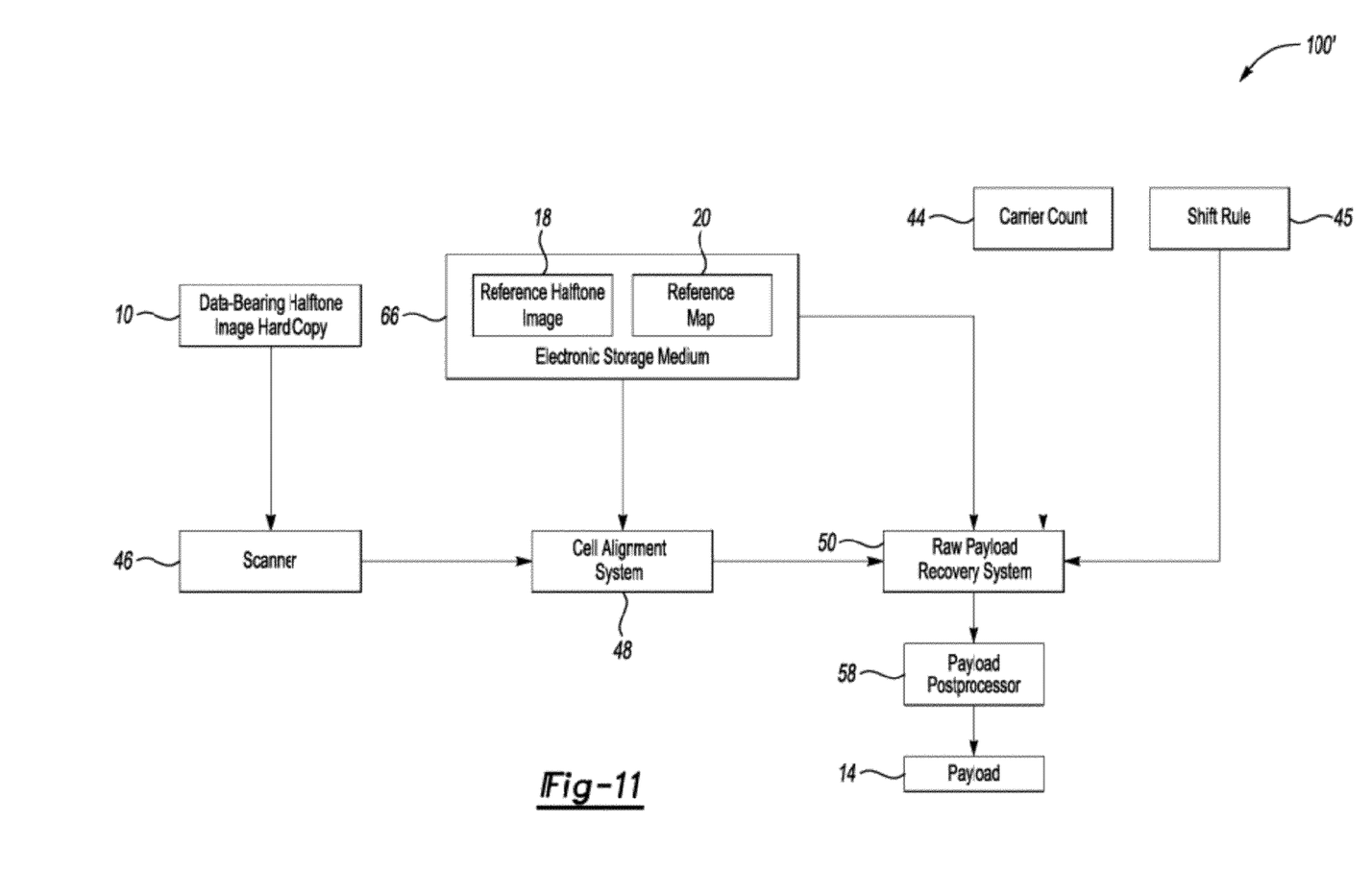
FIG. 11 is a schematic diagram of another embodiment of a payload recovery system.

Referring now to FIG. 11, another embodiment of the system 100' for recovering the payload 14 from a hard copy of a data-bearing halftone image 10 is depicted. In this embodiment, the reference halftone 18 and the reference map 20 generated during the creation of the data-bearing halftone image 10 is stored in an electronic storage medium 66. In some instances, the electronic storage medium 66 also stores the shift rule 45 therein. The electronic storage medium 66 is operatively connected to the reference image generator 26 (not shown in FIG. 11) as well as the cell alignment system 48 and the raw payload recovery system 50. Rather than regenerating a reference halftone 18 and reference map 20 for the data-bearing halftone image 10, the cell alignment system 48 and raw payload recovery system 50 can access these components 18, 20 from the electronic storage medium 66.

There are a number of ways in which the cell alignment system 48 and raw payload recovery system 50 can retrieve the reference halftone 18 and reference map 20. In one embodiment, the system operator may see the input image in the hardcopy and select a similar image (along with its associated reference halftone 18 and reference map 20) from the storage medium 66. In other embodiments, a workflow indicator may be used to initiate the task that has a second role as a token for the image; the document itself is recognized by template, titular/header/footer/etc. content; or a comparison is made between the scanned image and the images stored in a database of the storage medium 66.

The sub-systems 46, 48, 50 and 58 of the system 100' operate as previously described in reference to FIG. 1 in order to recover the payload 14 from the data-bearing halftone image 10.

While several embodiments have been described in detail, it will be apparent to those skilled in the art that the disclosed embodiments may be modified. Therefore, the foregoing description is not to be considered limiting.

What is claimed is:

1. A payload recovery system, comprising:
a reference halftone image of a data-bearing halftone image;
a reference map of the data-bearing halftone image;
a cell alignment system for receiving a scanned image of a hard copy of the data-bearing halftone image and for generating an aligned scan of the scanned image using the reference halftone image and the reference map;
a raw payload recovery system for determining possible shift positions of each carrier cell of the aligned scan using a shift rule and the reference map;
a reconstructed data-bearing halftone image generated by the raw payload recovery system using the possible shift positions and the reference halftone; and
a recovered raw payload generated by the raw payload recovery system using the shift rule and the reference map.

2. The payload recovery system as defined in claim 1, further comprising a payload postprocessor including:
an error correction decoding system;
a de-encryption system; and
a data decompression system;
wherein one or more of the systems of the payload postprocessor processes the recovered raw payload to generate a payload of the data-bearing halftone image.

3. The payload recovery system as defined in claim 1, further comprising an electronic storage medium that stores the reference halftone, the reference map, and the shift rule.

4. The payload recovery system as defined in claim 1, further comprising a reference image generator that generates the reference halftone and the reference map.

5. The payload recovery system as defined in claim 1, further comprising a scanner for generating the scanned image and for transmitting the scanned image to the cell alignment system.

6. The payload recovery system as defined in claim 1 wherein the cell alignment system can perform i) global, ii) affine and non-affine, or iii) selective alignment.

7. A payload recovery system, comprising;
   a reference image generator for generating, using an image, a reference halftone for a data-bearing halftone image associated with the image and a reference map of the data-bearing halftone image;
   a cell alignment system for receiving a scanned image of a hard copy of the data-bearing halftone image and for generating an aligned scan of the scanned image using the reference halftone and the reference map;
   a raw payload recovery system for determining possible shift positions of each carrier cell of the aligned scan using a shift rule and the reference map;
   a reconstructed data-bearing halftone image generated by the raw payload recovery system using the possible shift positions and the reference halftone;
   a recovered raw payload generated by the raw payload recovery system using the shift rule and the reference map; and
   a payload postprocessor for processing the recovered raw payload to generate a payload of the data-bearing halftone image.

8. The payload recovery system as defined in claim 7 wherein the reference image generator includes:
   an image preprocessor;
   a cell flattener;
   a reference map generator;
   a carrier cell flattener; and
   a halftoner.

9. The payload recovery system as defined in claim 7 wherein the payload postprocessor includes:
   an error correction decoding system;
   a de-encryption system; and
   a data decompression system.

10. A method for recovering a payload from a hard copy of a data-bearing halftone image, comprising;
    determining a boundary of each cell of a scanned image of the hard copy of the data-bearing halftone image to form an aligned scan;
    comparing the aligned scan with a shift rule and a reference map to identify possible shift positions for each cell of the aligned scan;
    generating a reconstructed data-bearing halftone image using the aligned scan, the possible shift positions, and a reference halftone of the data-bearing halftone image; and
    identifying a recovered raw payload from the reconstructed data-bearing halftone image using the shift rule and the reference map.

11. The method as defined in claim 10, further comprising processing the recovered raw payload to invert any transformations to the payload during encoding.

12. The method as defined in claim 11 wherein the processing of the recovered raw payload includes at least one of:
    performing error correction decoding;
    performing a decrypting process; or
    performing a decompressing process.

13. The method as defined in claim 10 wherein prior to determining the boundary of each cell of the scanned image, the method includes:
    locating a position of the data-bearing halftone image in the scanned image;
    de-skewing the scanned image; and
    tuning horizontal and vertical scale factors.

14. The method as defined in claim 13, further comprising using the reference halftone to identify non-carrier cells.

15. The method as defined in claim 10 wherein generating the reconstructed data-bearing halftone image is accomplished using a mean-square error method or a centroid method, each of which estimates an actual shift position from the possible shift positions.

16. The method as defined in claim 10 wherein prior to determining the boundary of each cell, the method further comprises generating the reference halftone and the reference map using a reference image generator and an original image used to generate the data-bearing halftone image.

17. The method as defined in claim 10 wherein prior to determining the boundary of each cell, the method further comprises retrieving the reference halftone, the reference map, and the shift rule from an electronic storage medium.

18. The method as defined in claim 10 wherein prior to determining the boundary of each cell, the method further comprises generating the scanned image of the hard copy of the data-bearing halftone image.

19. The method as defined in claim 10 wherein the determining of the boundary of each cell of the scanned image of the hard copy of the data-bearing halftone image is accomplished using i) global, ii) affine and non-affine, or iii) selective alignment.

20. The method as defined in claim 10 wherein identifying the recovered raw payload is accomplished using i) serial, ii) iterative or iii) simultaneous mapping of cells of the aligned scan to shift positions.

* * * * *